Feb. 16, 1960 B. A. SCHWARZ ET AL 2,924,980

MEANS FOR TUNING A RADIO RECEIVER

Original Filed Sept. 2, 1950 9 Sheets-Sheet 1

Inventors
Bertram A. Schwarz &
Manfred G. Wright
By
Willits, Helwig & Baillio
Attorneys

MEANS FOR TUNING A RADIO RECEIVER

Original Filed Sept. 2, 1950 9 Sheets-Sheet 2

Inventors
Bertram A. Schwarz &
Manfred G. Wright
By
Willits, Helwig & Baillio
Attorneys

MEANS FOR TUNING A RADIO RECEIVER

Original Filed Sept. 2, 1950 9 Sheets-Sheet 3

Inventors
Bertram A. Schwarz &
Manfred G. Wright
By
Willits, Helwig & Baillio
Attorneys

MEANS FOR TUNING A RADIO RECEIVER

Original Filed Sept. 2, 1950

Inventors
Bertram A. Schwarz &
Manfred G. Wright
By Willits, Helwig & Baillio
Attorneys Feb. 16, 1960 B. A. SCHWARZ ET AL 2,924,980

MEANS FOR TUNING A RADIO RECEIVER

Original Filed Sept. 2, 1950 9 Sheets-Sheet 5

Inventors

Bertram O. Schwarz & Manfred G. Wright

By Willits, Helwig & Baillio

Attorneys

Inventors
Bertram A. Schwarz &
Manfred G. Wright
By Willits, Helwig & Baillio
Attorneys Inventors
Bertram A. Schwarz &
Manfred G. Wright
By
Willits, Helwig & Baillio
Attorneys

MEANS FOR TUNING A RADIO RECEIVER

Original Filed Sept. 2, 1950 9 Sheets-Sheet 8

Inventors
Bertram A. Schwarz &
Manfred G. Wright
By
Willits, Helwig & Baillio
Attorneys Inventors
Bertram A. Schwarz &
Manfred G. Wright
By Willits, Helwig & Baillio
Attorneys United States Patent Office 2,924,980

Patented Feb. 16, 1960

2,924,980

MEANS FOR TUNING A RADIO RECEIVER

Bertram A. Schwarz and Manfred G. Wright, Kokomo, Ind., assignors to General Motors Corporation, Detroit, Mich., a corporation of Delaware Continuation of application Serial No. 183,069, September 2, 1950. This application February 4, 1958, Serial No. 713,124

19 Claims. (Cl. 74—10.52)

This invention relates to means for tuning radio equipment over a predetermined band of frequencies and to stop the same at definite indexed positions to be resonant to desired frequencies and more particularly to tuning means which is actuated to index by the incoming signal itself, and is a continuation of abandoned application S.N. 183,069 filed September 2, 1950 which was a continuation-in-part of abandoned application S.N. 63,152 filed Dec. 2, 1948.

Many of the commercially available radio receivers that are currently on the market are equipped with "push button" tuning means so that the receiver may be quickly brought into tune for a previously adjusted station. These tuners are merely mechanical indexing means that adjust the parts to predetermined locations to tune the receiver.

There are also on the market some receivers that are provided with some form of driving means to cause the tuner to sweep or scan the band and some means responsive to incoming signal strength to cause the driving means to become inoperative if a signal of sufficient strength is received. This general type of tuner control is described and claimed in a copending Patent No. 2,550,430 in the names of Bertram A. Schwarz and James H. Guyton, filed July 5, 1947, entitled "Electronically Controlled Tuner." The scanning drive in that case was described as a reversible motor which was controlled by the circuit disclosed.

It is an object of our invention to provide a novel driving means for causing the tuning means to sweep over its ambit and scan the band.

It is a still further object of our invention to provide a combination spring and solenoid drive for tuning means.

It is a still further object of our invention to provide arresting and speed control means for the spring and solenoid drive.

It is a still further object of our invention to provide both a manual and an automatic drive for the tuner.

It is a still further object of our invention to provide a differential manual drive for the tuning means.

It is a still further object of our invention to provide a differential manual drive for the tuning means which will not be injured at the end of travel of the tuner by continued rotation of the manual means.

With these and other objects in view which will become more apparent as the specification proceeds, our invention may be better understood by reference to the following specification and claims and the illustrations in the accompanying drawings in which:

Figure 1:
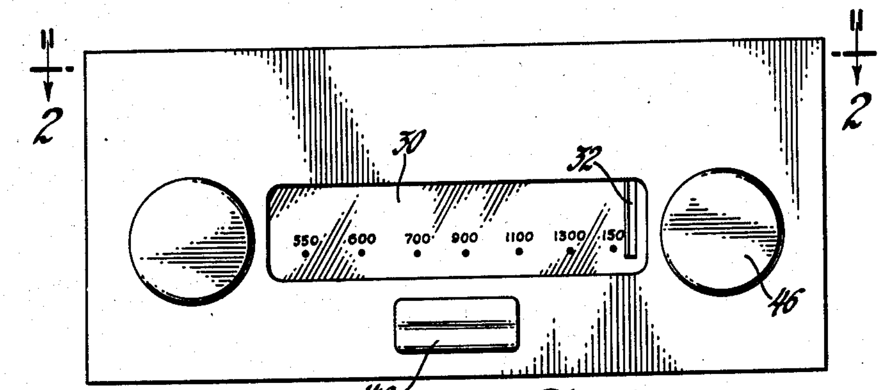
Figure 1 is a front elevation of the control panel of a radio receiver embodying our invention.

Referring now to that form of the invention shown in Figures 1 through 10 inclusive, it is conventional practice to tune a plurality of resonant circuits of a receiver either by varying the capacity of these circuits through the use of a variable condenser which is connected in a resonant circuit with a fixed inductance or to vary an inductance which is connected across a fixed condenser of a circuit. The latter type of tuning is shown here for illustrative purposes only as our invention is capable of use with either form.

The variable inductance or permeability tuning is accomplished by using a plurality of tuning coils 2 mounted in spaced parallel relation which are connected into the various resonant circuits of the receiver and then movably mounting a plurality of compressed comminuted iron cores 4 so that they may be simultaneously inserted into the coils to varying distances and thus change the inductance of each to tune the circuits desired. The cores 4 are adjustably mounted on a transverse bar 6 by having threaded ends 8 in engagement with threaded openings in the bar. This is primarily for alignment purposes and once adjusted are very seldom independently moved. Thus as the bar travels back and forth on the tuner the cores 4 will be plunged into the coils 2 and the set tuned.

The transverse bar 6 is supported on a movable carriage 10 having an upturned flange 12 at the front to which the bar is rigidly affixed. A main frame consisting of a base 14 and two integral upturned end portions 16 and 18 has a plurality of tie rods 20 extending longitudinally between the end portions to give the structure rigidity. The upturned carriage flange 12 has an opening therethrough through which one of the rods 20 projects and an additional flange 22 at the rear of the carriage also has an opening therein for the same rod; thus the rod acts as a track or trolley for the carriage as it moves back and forth and supports the same. Mounted on the base 14 are a pair of spaced supporting plates 24 and 26. These plates are parallel and in the main support the various driving gears. The front casing wall has an opening 28 therein in which the dial 30 is supported and through which the pointer 32 projects. The pointer is pivotally mounted at 34 on a pivoted link 36 carried by plate 26.

Figure 2:
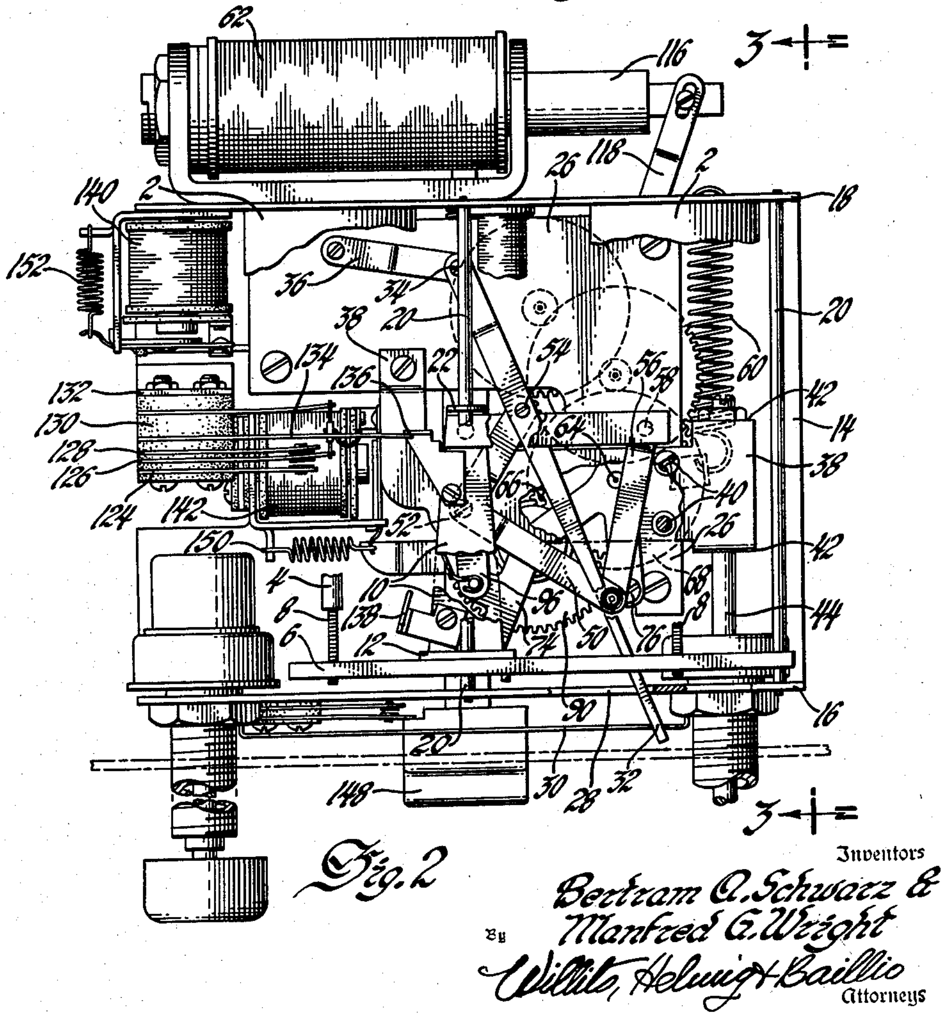
Figure 2 is a top plan view of the tuner with the casing removed taken on line 2—2 of Figure 1.
Figure 3:
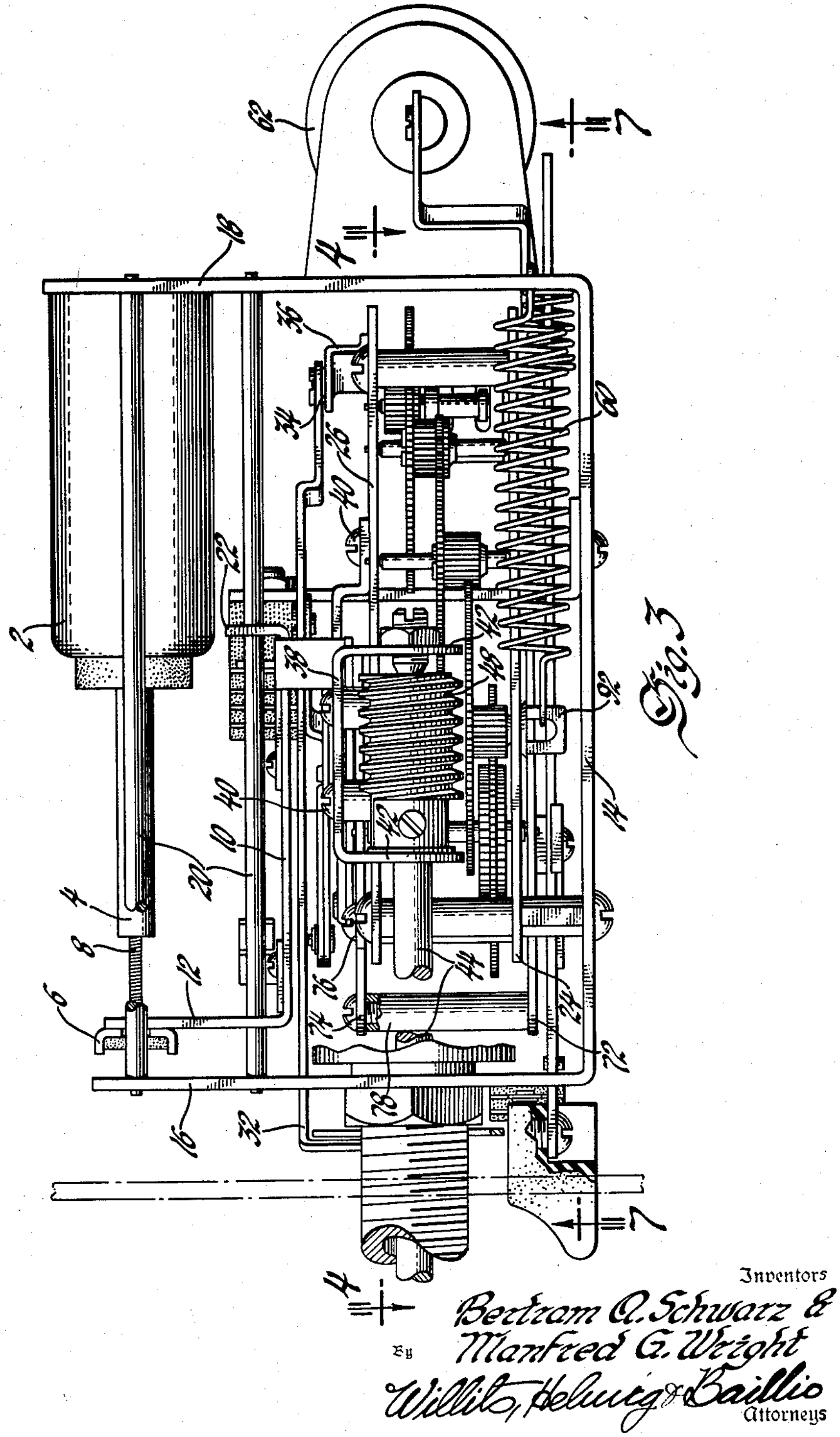
Figure 3 is a side elevation of the same taken on line 3—3 of Figure 2.
Figure 4:
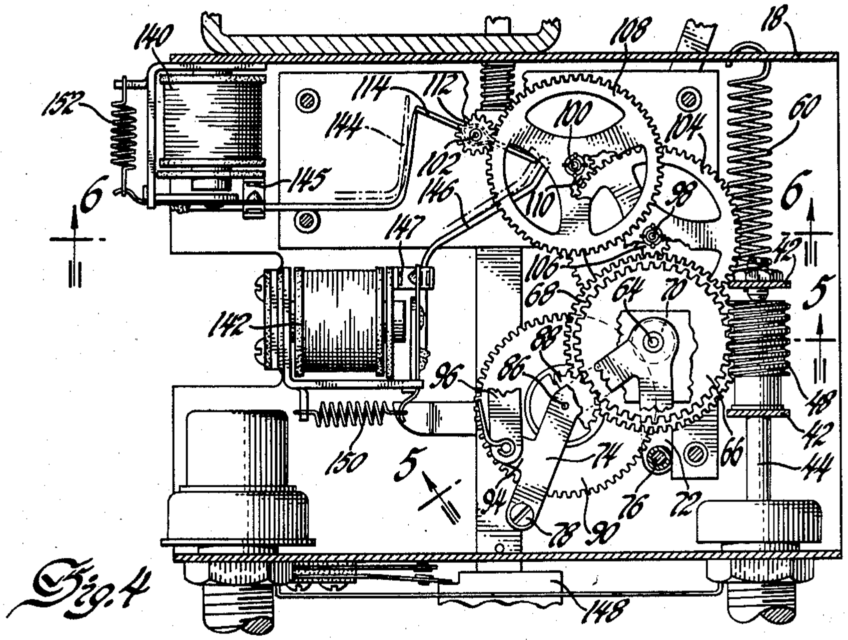
Figure 4 is a horizontal sectional view taken on the line 4—4 of Figure 3.

An additional supporting plate 38 is mounted on plate 26 by screws 40 and extends out over the edge of the latter as shown in Figure 2. Two ears 42 on this overhanging portion are bent down and provide aligned openings to rotatably support a manually operated shaft 44 driven by knob 46 on the control panel, said shaft carrying a worm 48. A bell crank 50 is pivotally mounted at 52 on this plate 38, the shorter arm of said crank being pivotally connected to the pointer at 54 and the longer end pivotally connected to a link 56 in turn connected to the carriage 10 at 58. Thus as the carriage moves longitudinally of the tuner assembly the link 56 will in turn rotate the bell crank to move the pointer and due to the geometry of the system the pointer will have substantially straight-line movement across the dial since the pivot 34 moves back and forth as the pointer 32 moves across the dial.

The movement of the carriage back and forth to move the cores 4 into and out of the associated coils to tune the receiver is accomplished either by manual gear drive or automatically by a spring 60 which is under tension and tends to move the carriage in one direction and a solenoid 62 which, when energized, moves the carriage in the opposite direction and cocks or loads the spring. It is obvious that the movement caused by the solenoid is rapid and consumes only a short period of time. The spring drive, however, is loaded through a movable gear train and is thus slowed down to a proper scanning speed. The manually operable knob 46 must also in some manner provide engagement to the gear train through its worm 48 so that the knob can be used to move the carriage and tune the set regardless of the position of the apparatus.

Figure 5:
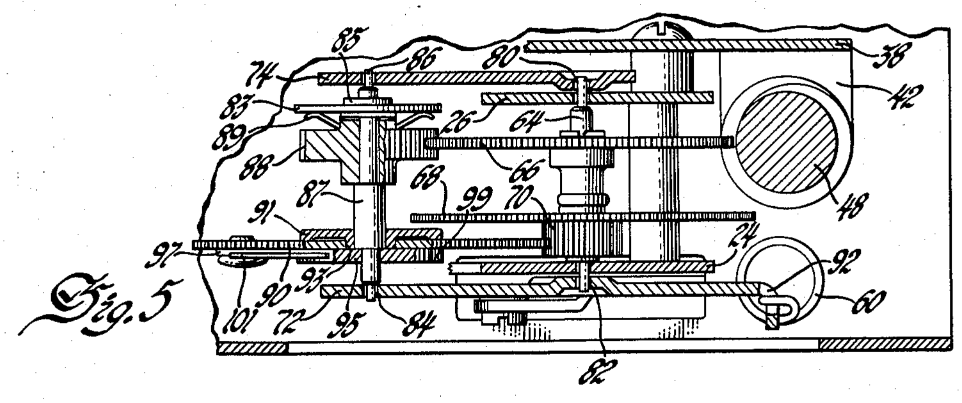
Figure 5 is a vertical sectional view showing the driving gears and taken on the line 5—5 of Figure 4.

Referring now more specifically to Figure 5, it will be seen that the two spaced plates 24 and 26 carry in vertically aligned openings a rotatable shaft 64 upon which are mounted a plurality of spur gears 66 and 68 and a pinion 70. Spur gear 66 acts as a worm wheel and engages the threads of the worm 48 to turn therewith. It may be rigidly secured to the shaft 64. Spur gear 68 is rigidly secured to pinion 70 and is adapted to turn therewith, both however, being free to rotate on the shaft 64.

Figures 8, 9:
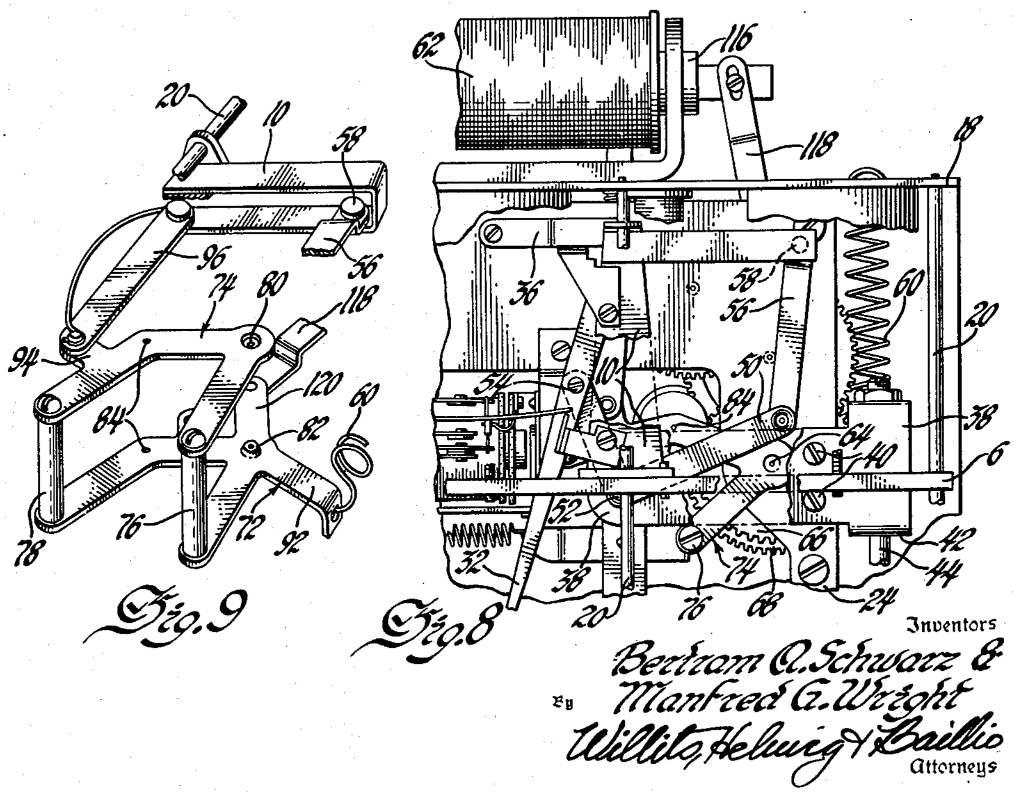
Figure 8 is a partial top plan view showing the reverse side of the mechanism shown in Figure 7.
Figure 9 is a perspective view of the planetary gear carriage.

A pivotally movable frame planetary carriage in which a multiplicity of gears and transfer shafts are mounted is used in conjunction with the gears already mentioned to transfer motion from either the manual or power drive to the carriage supporting the tuning cores. This rotatable carriage is best shown in Figure 9 and consists of two spiders 72 and 74 which are held in spaced relation to each other by spacing bolts 76 and 78. They are both of irregular configuration and are so shaped as to provide a plurality of spaced aligned openings in which to vertically support a plurality of shafts as well as to simultaneously provide extending arms or connections to other portions of the apparatus. At opposite points these two spiders 72 and 74 have been depressed toward each other adjacent aligned openings as at 80 and 82 and these openings are adapted to fit over projecting opposite ends of the shaft 64 which provides a pivot for the spider assembly. A second pair of aligned openings 84 support in a vertical position shaft 86.

A disc 83 is fixedly mounted on the upper end of the shaft 86 by a pin 85 or other suitable securing means. The shaft 86 has a section of larger diameter 87 which provides a shoulder for supporting gear 88 which is not keyed on shaft 86. A bowed spring 89 tends to force the gear 88 against the shoulder by exerting axial force on the upper face of the gear and the fixed disc 83. Gear 88 then will normally turn with shaft 86 but may slip thereon, providing a friction drive to protect the parts if driving force is continued after the tuning means reaches one extremity.

A plate 91 is mounted on the lower end of the shaft 86 through a pressed fit connection. This plate has an extending hub section 93 on which gear 90 is mounted for rotation. A ratchet wheel 95 is also rigidly connected to the shaft 86 and holds the gear 90 between its upper surface and the plate 91, the gear being freely rotatable on its mounting. A pawl 97 is pivotally mounted on the gear 90 and maintained in contact with the teeth 99 of the ratchet wheel 95 by an arcuate spring member 101 having one end secured to the lower surface of the ratchet wheel. (See Figure 7.) Thus the gear 90 is locked to the shaft through the ratchet and pawl for driving in one direction but is freely rotatable thereon for rotation in the opposite direction. This is to provide for the rapid cocking movement by the solenoid.

Spider 72 has a projecting arm 92 to which one end of the drive spring 60 is secured, the opposite end of said spring being retained in end wall 18 of the casing. Thus spring 60 tends to rotate the spider assembly counterclockwise as shown in Figure 9 about the axis of shaft 64 at bearings 80 and 82. Spider arm 74 also has a projecting ear 94 to which is connected a link 96, the opposite end of which is pivotally connected to the main carriage 10. Thus as the spider assembly rotates around the axis of the shaft 64 it causes the carriage 10 to move longitudinally of the tuner and tune the receiver.

Figure 6:
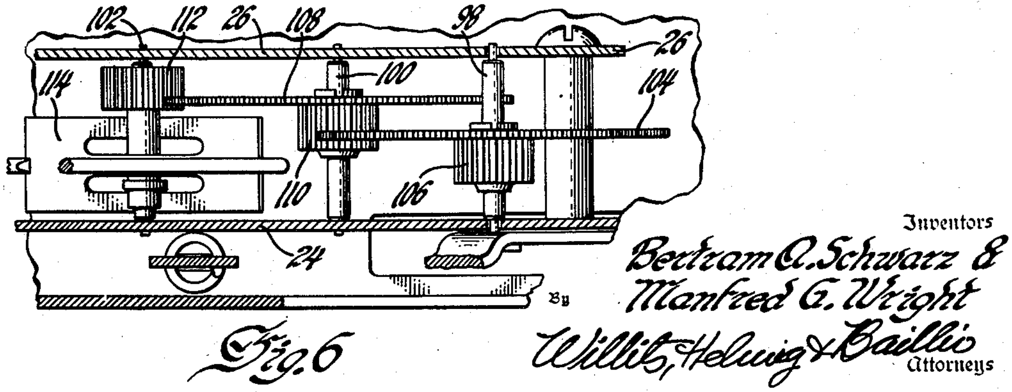
Figure 6 is a sectional view showing a part of the driving gears and the governor taken on line 6—6 of Figure 4.

To continue with the driving gear train and referring now more specifically to Figure 6, the two plates 24 and 26 support a plurality of vertical spaced shafts 98, 100 and 102, shaft 98 having mounted thereon spur gear 104 and pinion 106, shaft 100 carrying in like manner spur gear 108 and pinion 110 and lastly, shaft 102 carrying transfer pinion 112. The pinion 106 is adapted to be engaged by spur gear 68 mounted on the first described shaft 64. The gear train then, is evident from pinion 106 which rotates with spur gear 104 to drive the mating pinion 110 which rotates in like manner rigidly with spur gear 108, the last named gear mating with and driving pinion 112 on shaft 102. This is a straight reduction gearing by which the governor is driven from the original train, the governor in this instance being a rectangular flat plate 114 having slots therein and a bowed out section to support it on shaft 102 so that it acts as a friction or air governor as that shaft rotates. It is, of course, rigidly secured to its shaft. Any other similar type of governor may of course be substituted.

Figure 7:
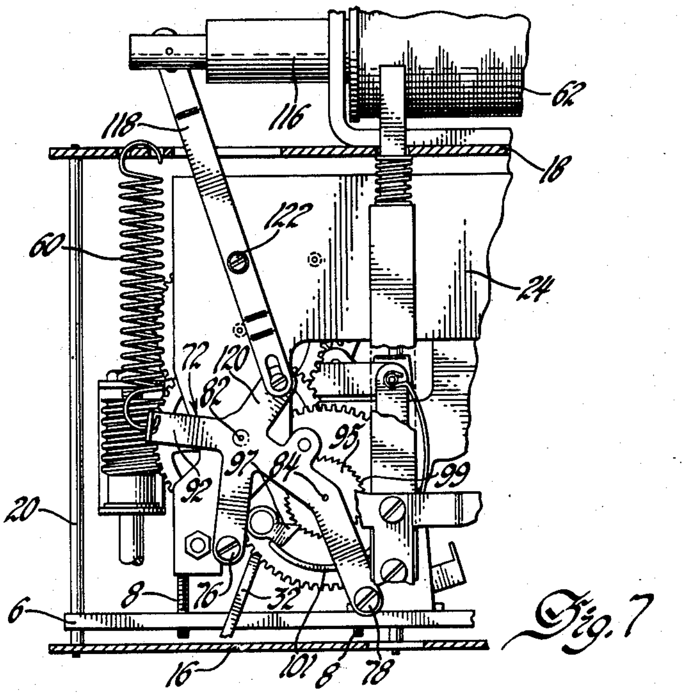
Figure 7 is a partial bottom plan view taken on line 7—7 of Figure 3.

It will thus be evident that the spring 60 tending to rotate the spider carriage counterclockwise as shown in Figure 9, tends to move the main carriage 10 toward the front of the receiver or to pull out the tuning cores to their extreme position from their association with the coils 2. Some means must therefore be provided to move the mechanism to the opposite extreme position or cock the spring so that the latter may again bias it to return it to the front. This means, as previously stated, is a solenoid coil 62 which is mounted on the back of the vertical wall 18 and which has a movable core 116 to which is pivotally mounted one end of a lever 118, the opposite end of which is pivotally connected to an additional extension 120 on the spider 72. This interconnecting lever 118 has a fixed pivot 122 on the under side of plate 24. Thus as the solenoid sucks in its core and therefore turns the lever 118 clockwise around the pivot 122, as shown in Figure 7, the spider carriage will be turned in a counterclockwise direction, the pawl slipping over the ratchet wheel, to again tension the drive spring 60 and start the carriage slowly rotating to withdraw the core 116 from the solenoid and scan the band in that direction.

Switching means must therefore be provided to energize the solenoid at the end of travel in one direction and to deenergize it when it has returned the carriage to the other extreme of travel. This switching means incorporates a plurality of switch arms 124, 126 and 128 which are mounted between insulating wafers 130, which form a block, the whole being supported on an upstanding arm 132 from the base 14. A snap-over spring actuating arm assembly 134 engages the outer end of the movable switch contact arm 126 to aternately move it from one side to the other. This arm 134 also projects out into the path of two upstanding ears 136 and 138, which are mounted on the carriage 10 and are adapted to engage and cause snap-over of switch arm 134 at opposite ends of travel.

In order to tune the set manually, we have provided a differential manual drive so that the gear train may be used for the automatic drive, but when that is locked the manual knob may be used to move the tuning carriage. During automatic tuning the worm 48 is of course stationary, and since worm wheel 66 is in mesh therewith, it cannot rotate. Gear wheel 66, therefore, acts as a reaction point and the spider carriage rotates about the axis of the gear 66. As the spider carriage rotates about this axis, caused by the spring, the gear 88, which is in mesh with the periphery of 66, will rotate and this will drive the gear train to provide the load, and also rotate the governor. When driven by the solenoid rapidly the gear 88 rotates the shaft 86 but the pawl slips over the ratchet wheel and gear 90 is not driven. However, if the governor is locked by engagement with one of the stopping arms, then the gear 88 cannot rotate about its own axis and rotation of the manual knob 48 and wheel 66 will cause the carriage to have planetary motion or walk as a whole around the periphery of the gear wheel 66. Thus either wheel 66 is locked for automatic movement or wheel 88 is locked for manual.

If the manual knob 46 is rotated to cause the tuning means to move to one extremity of travel and then continued force applied which might cause parts to be broken, such action will overcome the friction lock on gear 88 and it will rotate an shaft 86 thus protecting the gearing from damage.

As stated previously, the spring provides a steadily constant drive in one direction to move the carriage so that the comminuted cores are moved out of their associated coils. The required slow movement is provided by the load of the gear train and the air resistance of the governor. However, the receiver must be controlled and stopped at certain points depending upon the existence of wanted signals and in order to properly control, index and stop the same, there are provided a pair of relays 140 and 142 which are mounted upon the base and each of which is adapted to actuate an armature to which is rigidly secured angularly shaped stop rods 144 and 146. These rods project to a position adjacent the governor 114 but are movable to position out of contact therewith.

These two relays have different functions to perform. By reference to Figure 4, it will be seen that when relay 140 is deenergized, the arm 144 will move to stop the governor. This locks the mechanism when the set is deenergized and the main switch is off. This relay also has a lock-in contact 145 insulated from the armature which closes the hold-in circuit once the set is turned on and the push button switch 148 has been pushed. The second relay 142 operates in the opposite sense. That is, it acts as a stop for the governor when the relay coil is energized and the armature drawn in against the spring pressure. This armature also carries an insulated switching contact, cooperating with contact 147.

Figure 10:
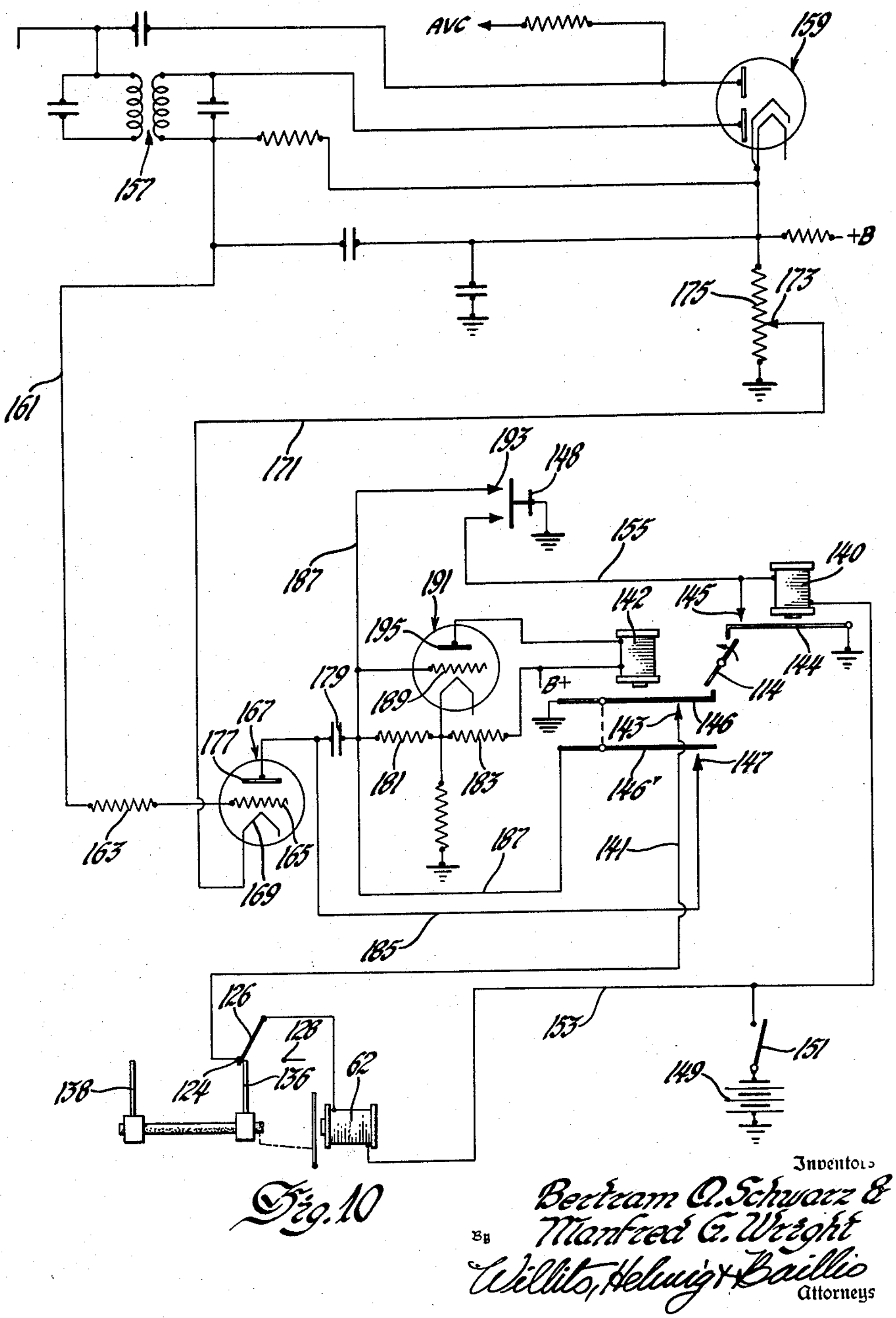
Figure 10 is a circuit diagram showing the electrical control circuit for the form of tuner shown in Figures 1–9.

A circuit diagram of the various electrical connections for the system is shown in Figure 10. A battery 149 is provided which is connected to main switch 151, and thence to conductor 153. The latter extends to one terminal of the solenoid coil 62 and to one terminal of the relay coil 140. The opposite terminal of the solenoid operator coil 62 is connected directly to movable switch arm 126, which is snapped over center by arms 136 and 138 to reverse the direction of carriage drive. The opposite terminal of the relay 140 is connected to line 155, which extends to grounding switch 148. Holding contact 145 is likewise connected to line 155.

The control circuit for indexing relay 142 is similar to those disclosed in the co-pending Schwarz and Guyton Patent No. 2,550,430, previously mentioned, and will only be briefly described here as it forms no part of the present invention. One of the resonant coupling circuits 157 of a radio receiver is shown connected to the rectifier tube 159. A conductive line 161 extends from this coupling circuit to resistor 163 and thence to grid 165 of tube 167. The cathode 169 of this latter tube is connected through line 171 to a variable tap 173 on resistor 175 in the cathode circuit of tube 159. The plate 177 of tube 167 is connected to condenser 179 and thence through two resistances 181 and 183 in series to the positive potential of a B battery, as indicated by B+. Conductive line 185 extends from the plate circuit to the contact 147 of relay 142. Movable armature 146′, which is in reality a physical part of arm 146, is adapted to contact 147 and is electrically connected to line 187, which extends to a point intermediate condenser 179 and resistor 181, to the grid 189 of the tube 191 and to a grounding contact 193, which cooperates with the switch 148. Arm 146, which is grounded, also engages stationary contact 143 in its deenergized position, which later is connected to contact 124 by line 141. The plate 195 of tube 191 is directly connected to relay 142.

In the operation of the tuner, let it be assumed that the parts are in the position shown and the set deenergized. Switch 151 is first closed. This completes an obvious circuit through solenoid coil 62 to energize the same and cause the carriage to move to the opposite extremity. As it approaches this position, arm 138 engages switch arm 126 to move it to the right as shown in Figure 10, breaking its contact with switch point 124 to deenergize the coil 62, and moving it into engagement with switch point 128, which merely acts as a stop. At this point, the spring 60 is now in condition to drive through the series of gears and the governor load, but it can not do so since arm 144 engages the end of the fly governor to restrain it from movement, being held there by the tension of the spring 152. At this point arm 146 is biased out of engagement with the fly governor by spring 150, and would permit it to rotate and the carriage to move to cause a scanning of the band electrically.

After a short period of time to permit the various tubes to warm up, the operator may force in switch 148, which is simply a grounding switch, but in this instance it completes a circuit through the coil 140 and this coil, therefore, attracts its armature to disengage the arm 144 from the governor and the spring begins to drive the carriage slowly across the tuner. At the same time a holding circuit is completed through the relay 140 by engagement between the arm 144 and stationary contact 145. This will maintain the arm 144 out of engagement with the governor until such time as the set is next turned off, the main purpose of this arm being to keep the tuner in the position it last held, prior to turning off the main switch. If the tubes have not as yet warmed up sufficiently to pass an adequate signal, the tuner will merely keep scanning the band until such period of time has passed.

Tube 167 is designed to normally pass current when the tuner is working or scanning the band, and since current would flow in its plate circuit if it were conducting, this places a bias on the grid 189 of the tube 191 through potential drop across resistor 181 and tube 191 would, under these conditions, be non-conductive. However, as soon as a signal of sufficient strength applies a potential on line 161, it overcomes the potential on the grid 165 and causes this tube to become non-conductive, at which instant the bias will be removed from the grid 189 and tube 191 will conduct. Relay 142 is now energized and will pull arm 146 into engagement with the fly governor 114, and stop the tuner on station. This also breaks the grounding circuit for relay 62 so that that relay cannot become energized as long as relay 142 remains energized. It will remain energized until the operator is desirous of obtaining another station, at which time, by closing switch 148, the tube 191 is shunted to cause relay 142 to drop out and close a shorting contact on the condenser 179. The tubes go back to their prior described condition, coil 140 is energized to remove the arm 144 from engagement with the governor 114, and the tuner again scans, until a further station signal causes them to again stop on station.

The modified form of our invention shown in Figures 11 through 17 inclusive operates on the same general principles as the form just described. In this form there is provided a casing 160 within which are mounted a plurality of tuning coils 2 into which the series of comminuted cores 4 are plunged to tune the receiver. The cores are, as in the previous instance, mounted in adjustable spaced parallel relation on a transverse bar 6, which is rigidly secured to a longitudinally movable carriage 10 guided, as previously, by a tie rod 20 which acts as a track therefor. An internal frame platform 170 has an actuating solenoid 162 mounted thereon whose plunger or armature 164 is pivotally connected to one end of a large sector gear 166 by a link 164'. This gear is itself pivotally mounted at 168 on the platform 170 and has a series of teeth 172 in its outer arcuate edge.

Figures 11, 12:
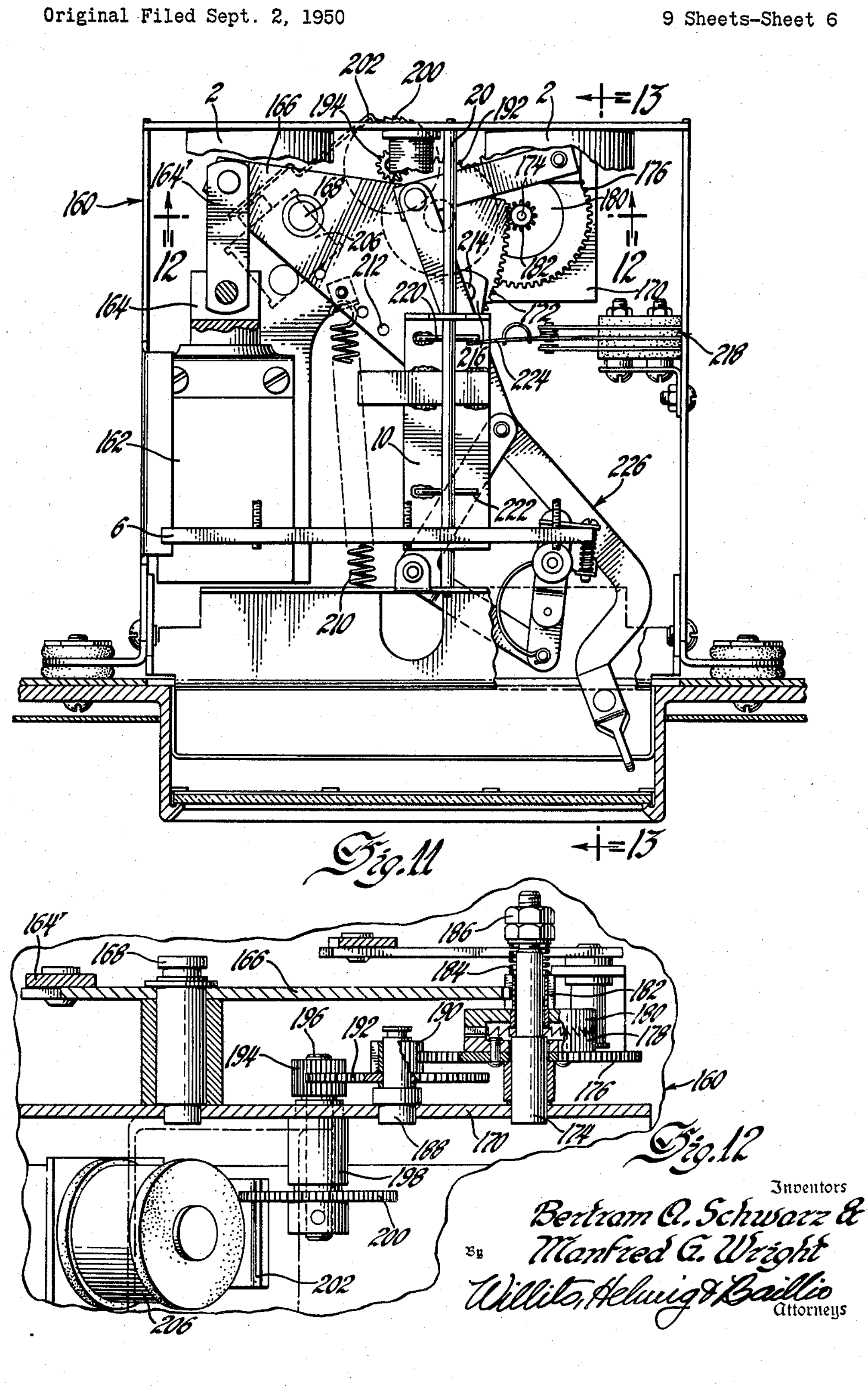
Figure 11 is a top plan view of a modified form of tuner embodying our invention.
Figure 12 is a transverse vertical sectional view taken on the line 12—12 of Figure 11.
Figures 13, 14:
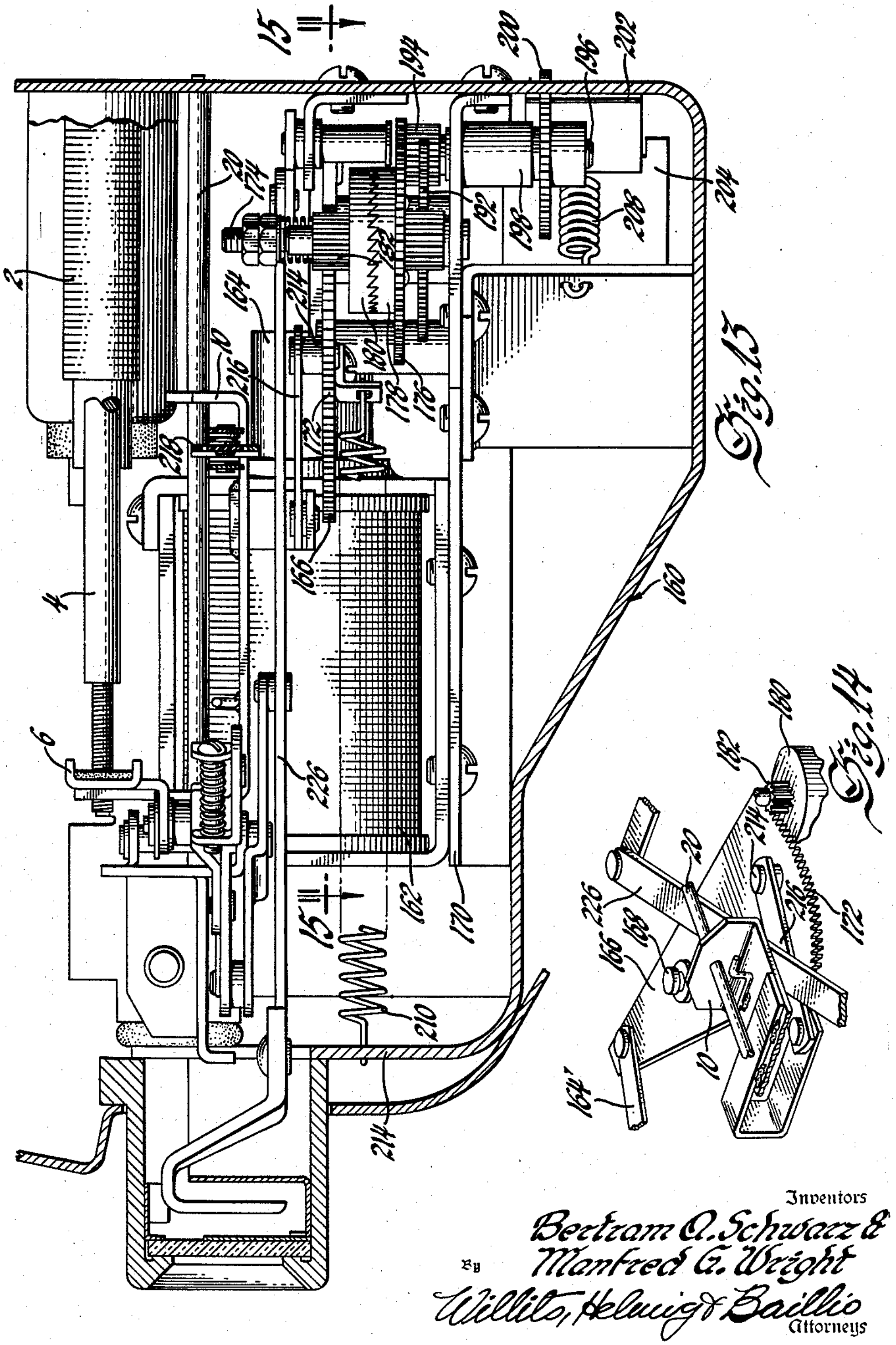
Figure 13 is a longitudinal vertical sectional view taken on the line 13—13 of Figure 11.
Figure 14 is a perspective view showing the sector gear drive for this form of our invention.
Figure 15:
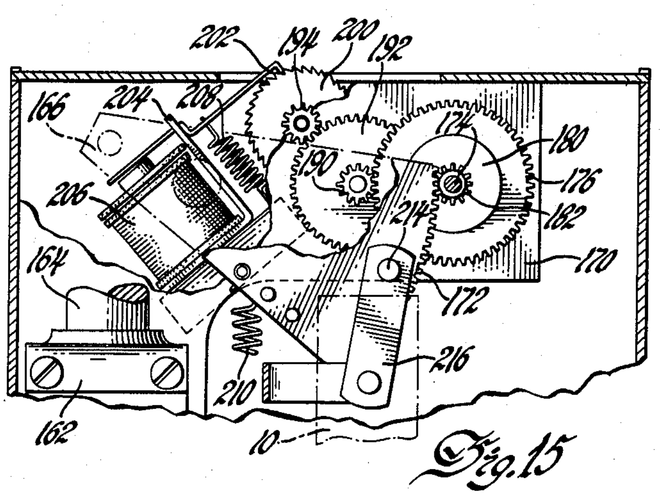
Figure 15 is a horizontal sectional view taken on the line 15—15 of Figure 13.
Figure 16:
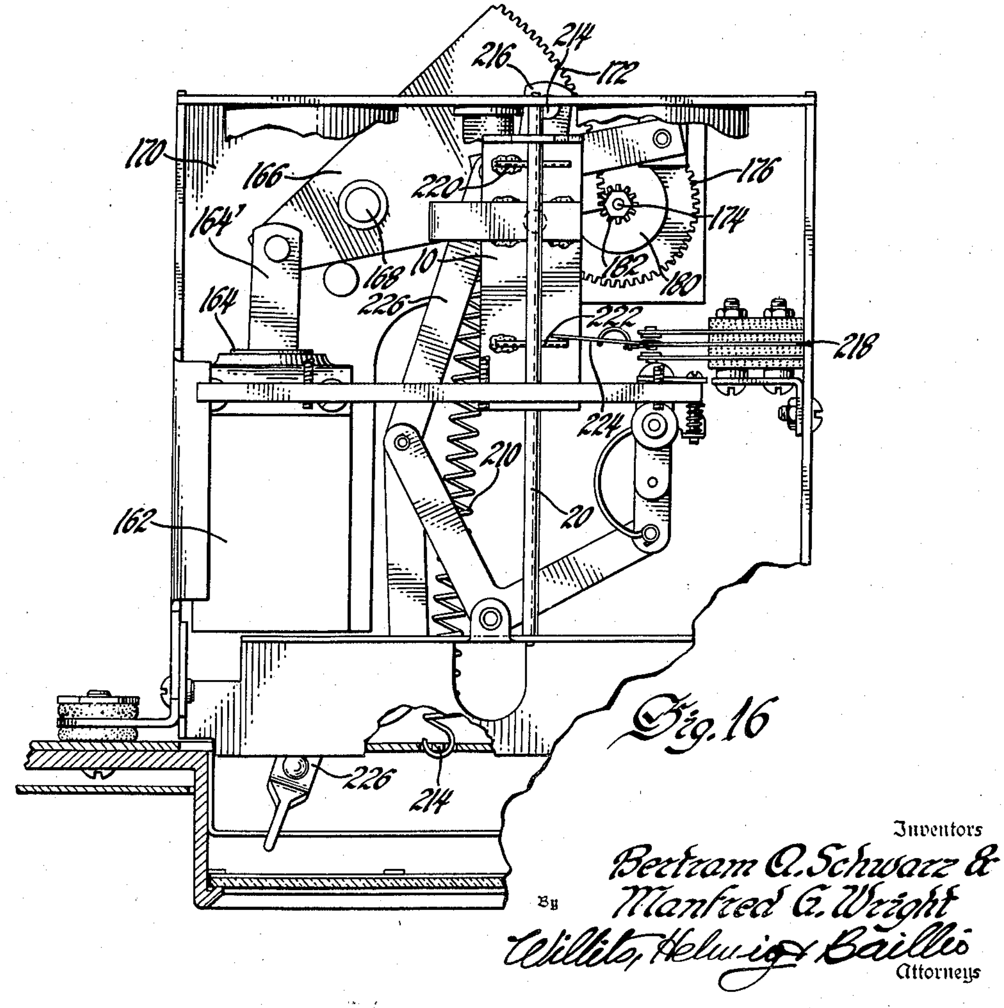
Figure 16 is a top plan view similar to Figure 11 showing the parts in the opposite extreme position of movement.

The platform carries a stub shaft 174 rigidly thereon adjacent the outer edge of the sector gear. This stub shaft is provided with sections of differing diameter and the outer end is threaded. A large spur gear 176 is rotatably mounted on this shaft and has rigidly affixed to one side thereof a circular toothed member 178 which forms one-half of a one-way or overrunning jaw clutch. A second toothed member 180, having teeth on the side adapted to engage the teeth on the member 178, said associated teeth being so tapered that they will provide a drive from member 180 to member 178 in one direction but will slip over the associated teeth when rotated in the opposite direction, is mounted on the next section of the shaft 174. A pinion 182 is likewise mounted on the shaft next in order and is rigidly secured to rotate with the clutch member 180. A concentric spring member 184 bears against the upper end of the pinion gear 182 tending to force it axially downward on the shaft 174 as shown in Figure 11, and is retained in compressed condition by locking nuts 186, which are threaded on to the outer end of the shaft 174. The compressed spring 184 tends to keep the clutch members 180 and 178 in engagement but permits them to move apart when the tapered toothed surfaces are rotated so that one set tends to climb over the other. The amount of tension may, of course, be adjusted by moving lock nuts 186.

The frame plate 170 also supports a shorter stub shaft 188 in spaced relation to shaft 174, the shaft 188 rotatably supporting a transfer pinion 190, which is rigidly secured to a spur gear 192 to rotate therewith. The pinion engages the spur gear 176 and the associated spur gear 192 drives a second pinion 194 mounted on a short drive shaft 196, which is supported in a bearing 198 also carried by the plate 170. On the opposite side of the plate 170 from the pinion 194 there is mounted on this shaft 196 a ratchet gear 200, which acts as the indexing stop member having a pawl or indexing member 202 which is so mounted as to contact the periphery of the wheel 200 for indexing purposes. The pawl arm 202 is pivotally mounted on a frame member 204 and actuated by a relay coil 206, supported on a bracket from the frame member 170. A spring member 208 tends to maintain the pawl arm 202 in contact with the indexing wheel 200, but the pawl arm is withdrawn from contact with the wheel 200 by energization of the relay coil 206.

From the above it will be obvious that the sector gear is rotated about its pivot 168 in one direction by the solenoid 162 when the latter inductively sucks its armature inwardly. This sector plate is moved in the opposite direction about its pivot by a coil spring 210, which has one end engaging one of a series of openings 212 in the edge of the sector gear, the other end of said spring being attached to a frame member as at 214. By moving the end of the spring member 210 to different radially spaced openings in the side of the sector gear, the amount of spring tension for driving the same may be varied. The sector gear 166 may, therefore, be rotated in one direction about its pivot by action of the solenoid and in the opposite direction by action of the spring 210.

In order to provide a drive means from the sector gear to the carriage 10, a pin 214 is driven into the side of the sector gear adjacent the toothed end, said pin being connected by a link system 216 with the carriage 10, and as the sector gear rotates back and forth the carriage will be moved longitudinally to its two desired limits. A reversing switch assembly 218 is provided and two fixed actuating members 220 and 222 engage the snap-over switch arm 224 of the reversing switch at opposite ends of the track. A similar pointer or indicator assembly 226 is shown for indicating the position of the tuning mechanism.

Figure 17:
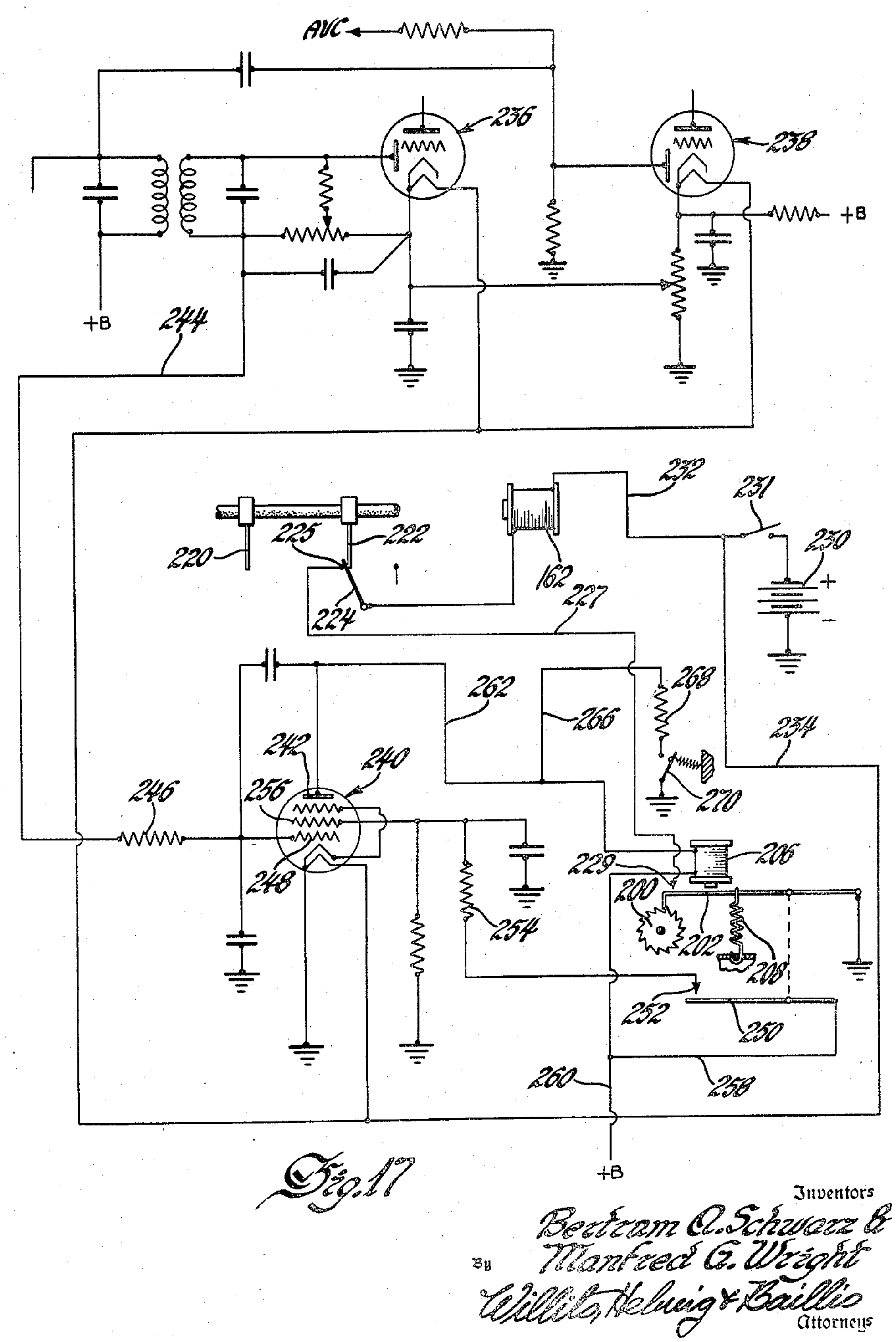
Figure 17 is a circuit diagram showing the electrical circuit for this modified form of tuner.

In the circuit diagram shown on Figure 17 for this form of our invention, there is provided a battery 230. A switch 231 and conductive line 232 are connected to the battery and to the solenoid coil 162 and thence to the reversing switch arm 224. One of the stationary contacts 225 which the switch arm 224 engages is grounded through line 227 and contact 229 with which the grounded arm 202 engages when coil 206 is energized. A conductive line 234 extends from switch 231 to the cathodes of each of the tubes 236, 238, and 240. Relay 206 is directly connected to the plate 242 of tube 240 and is energized when this tube conducts. In this case, however, the index wheel is locked or indexed when the relay is deenergized and continues to run when relay 206 is energized. The incoming signal developed is applied to line 244 and through resistor 246 to control grid 248 of tube 240.

The armature 202 also carries a movable arm 250, which engages a switch contact 252 connected through resistor 254 to grid 256 of tube 240. Arm 250 is connected through line 258 to the B battery line 260. Conductive line 262, which extends from plate 242 to relay 206 is tapped and connected by line 266 through resistance 268 and switch 270 to ground.

In the operation of this modification, the main switch 231 is first closed to warm up the tubes and place the equipment in operative condition. The arm 202 engages the teeth on the wheel 200 due to spring bias and that is locked.

When a sufficient length of time has elapsed to place the tubes in operative condition, switch 270 is closed momentarily to complete an obvious circuit for relay coil 206, which attracts its armature and permits the wheel 200 to turn and through the gear train load the sector gear so that it slowly rotates about its pivot and moves the tuning carriage along its path to scan the band. It also completes the circuit for solenoid 162 through grounding contact 229, and, when arm 222 throws arm 224 to the position shown in Figure 17, which is of course at one extremity of travel, the solenoid operation immediately moves the sector gear to the other extremity of its movement to cock the driving spring. Simultaneously with the removal of the stop 202, the movement of the armature closes switch 252, which applies a biasing potential to grid 256 of control tube 240. If the tube has had a sufficient time to warm up, it now conducts and relay 206 remains energized and the spring drive will scan the band.

Upon the receipt of a signal of sufficient strength to actuate the control system, depending on its setting, a negative voltage will be applied to grid 248 to cut off the flow in the tube and relay 206 will drop its armature to lock the wheel 200 and index the tuner.

If that station is not desired, the operator momentarily closes switch 270 again, which energizes relay 206 directly, and starts the drive toward the next station. There is no manual drive provided with this form of our invention, but if the operator desires to move a large distance across the band to a desired station, he may hold the switch 270 in until the approximate location of the desired station is reached, and the tuner will proceed in uninterrupted motion until the switch 270 is released and then the next incoming signal will stop it.

We claim:

1. In radio receiving means, movable tuning means for tuning the receiver over a predetermined band of frequencies, electro-mechanical driving means, energy transferring means interconnecting the electro-mechanical driving means and the movable tuning means and having a plurality of force reaction points about which parts of the energy transferring means may move to move said movable tuning means, relay actuated means operatively engageable with the energy transferring means to index the movable tuning means upon receipt of an incoming signal and to provide a force reaction point in the energy transfer means and manually operable means engageable with a different point in the energy transferring means to drive the same to move the energy transferring means about the force reaction point provided by the relay actuated means when that has indexed upon a particular station.

2. In radio receiving means, movable tuning means for tuning the receiver over a predetermined band of frequencies, energy transferring means connected to said movable tuning means and having a plurality of force reaction points about any of which the energy transferring means may move to move said movable tuning means, electro-mechanical driving means operatively connected to said energy transferring means to move the latter about one force reaction point and tune the receiver and manually adjustable means operatively connected to said energy transferring means to move the same about another force reaction point and also tune the receiver.

3. In radio receiving apparatus, a frame, a carriage reciprocably mounted on said frame, means for tuning said radio apparatus over a predetermined band of frequency mounted on said carriage, automatically controlled driving means for moving said carriage in both directions, force transmitting means connected to said driving means and having a plurality of interconnected parts sequentially transmitting force, indexing stopping means engageable with a part of the force transmitting means to engage and lock the same upon the receipt of an incoming signal in the apparatus and manually operated means operatively connected to another part of the force transmitting means to drive the carriage while the part first mentioned is prevented from moving due to the engagement of the indexing stopping means.

4. In mechanism for moving a carriage in opposite directions over a predetermined path, power means connected thereto to drive it in either direction between prescribed limits, a multiplying gear train connected to the carriage to be driven by movement of the same, indexing means engageable with the gear on the opposite end of the train from that connected to the carriage to index and lock the same to stop carriage movement at desired points and manually actuatable means connected to the gear train to drive the carriage when the gear train is locked.

5. In mechanism for moving a carriage in opposite directions over a predetermined path, resilient means to drive the carriage in one direction connected to said carriage, solenoid means connected to said carriage for moving it in the opposite direction, a gear train connected to said carriage and driven by movement of the same, a governor connected to the opposite end of the gear train to provide a damping effect and slow down the speed of travel induced by the resilient drive, ratchet means in said gear train to provide drive in the direction of travel induced by the resilient bias but rotate freely in the direction of solenoid drive to remove the gear load when the solenoid is loading the resilient means, index means engageable with the governor to lock the same at desired positions, and manually rotatable means engaging said gear train to provide a reaction point when the resilient drive is operating and to drive the carriage when the gear train is locked by the indexed means.

6. In mechanism for moving a carriage in opposite directions over a predetermined path, resilient means to drive the carriage in one direction connected to said carriage, solenoid means connected to said carriage for moving it in the opposite direction, a gear train connected to said carriage and driven by movement of the same, a governor connected to the opposite end of the gear train to provide a damping effect and slow down the speed of travel induced by the resilient drive, ratchet means in said gear train to provide drive in the direction of travel induced by the resilient bias but rotate freely in the direction of solenoid drive to remove the gear load when the solenoid is loading the resilient means, index means engageable with the governor to lock the same at desired positions, manually rotatable means engaging said gear train to provide a reaction point when the resilient drive is operating and to drive the carriage when the gear train is locked by the index means, said gear engaged by the manually rotatable means being frictionally mounted so that continued movement of the manual means after the carriage has reached one limit of movement will cause the gear to slip and prevent damage to the device.

7. In a mechanism for moving tuning elements of a radio receiver having a member movable between prescribed limits over a given path connected to said tuning elements, a pivotally mounted framework connected to said member to move the same by its rotation about its pivot, driving means connected to said framework to move it in opposite directions, a shaft in said framework, a first gear frictionally mounted on said shaft, a second gear freely mounted on said shaft, a pawl and ratchet connection between said second gear and the shaft, a gear train engaging said second gear and means engaging said first gear so that the gear train will be driven by the second gear as the framework revolves and moves the tuning means, said gear train acting as a damping load for this movement.

8. In a mechanism for moving tuning elements of a radio receiver having a member movable between prescribed limits over a given path connected to said tuning elements, a pivotally mounted framework connected to said member to move the same by its rotation, driving means connected to said framework to move it in opposite directions, a shaft in said framework, a first gear frictionally mounted on said shaft, a second gear freely mounted on said shaft, a pawl and ratchet connection between said second gear and the shaft, a gear train engaging said second gear and manually movable means meshing with said first gear to act as a reaction point and cause said shaft to turn in said second gear to drive the gear train when the framework moves around its pivot due to the driving means.

9. In a mechanism for moving tuning elements of a radio receiver having a member movable between prescribed limits over a given path connected to said tuning elements, a pivotally mounted framework connected to said member to move the same by its rotation, driving means connected to said framework to move it in opposite directions, a shaft in said framework, a first gear frictionally mounted on said shaft, a second gear freely mounted on said shaft, a pawl and ratchet connection between said second gear and the shaft, a gear train engaging said second gear, manually movable means meshing with said first gear to act as a reaction point and cause said shaft to turn in said second gear to drive the gear train when the framework moves around its pivot due to the driving means, locking means engageable with the most remote gear of the gear train to stop the framework at desired positions said manually movable means driving said framework when said gear train is locked and said first gear overcoming its frictional mounting if continued movement of said manually movable means continues after the framework has reached a limit of movement.

10. In indexing means, a casing, a carriage movably mounted on said casing, a solenoid connected to said carriage to move the latter in one direction upon energization, spring biasing means connected to said carriage to move the latter in the opposite direction, a gear train connected to said carriage to be rotated by movement of the same, a portion of said gear train being of the planetary type and manually rotatable means mounted to engage the gear train so that the carriage may be moved in one direction by the solenoid, in the opposite direction by the spring or in either direction by the manual drive.

11. In indexing means, a casing, a carriage movably mounted on said casing, a solenoid connected to said carriage to move the latter in one direction upon energization, spring biasing means connected to said carriage to move the latter in the opposite direction, a gear train connected to said carriage to be rotated by movement of the same, a governor connected to the end of the gear train to dampen the rotation and control the movement of the carriage when under spring drive, a portion of the gear train being planetary and manually rotatable means connected to the gearing to drive the carriage.

12. In radio apparatus, a casing, a carriage mounted for reciprocatory motion on said casing, means for tuning said radio apparatus over a predetermined frequency band mounted on said carriage, a pivotally mounted framework, link means interconnecting said carriage and framework to cause reciprocation of the carriage as the framework rotates, a train of gearing carried by the casing, manually rotated means mounted on the casing and meshing with the gear train and planetary gearing mounted in the framework and in mesh with the gear train to cause rotation of the framework and drive the carriage upon the operation of the manually rotated means.

13. In radio apparatus, a casing, a carriage mounted for reciprocatory motion on said casing, means for tuning said radio apparatus over a predetermined frequency band mounted on said carriage, a pivotally mounted framework, link means interconnecting said carriage and framework to cause reciprocation of the carriage as the framework rotates, a train of gearing carried by the casing, manually rotated means mounted on the casing and meshing with the gear train, planetary gearing mounted in the framework and in mesh with the gear train to cause rotation of the framework and drive the carriage upon the operation of the manually rotated means, solenoid means connected to said framework to rotate it in one direction upon energization and spring biasing means connected to the framework to rotate it in the opposite direction when the solenoid is deenergized.

14. In radio apparatus, a casing, a carriage mounted for reciprocatory motion on said casing, means for tuning said radio apparatus over a predetermined frequency band mounted on said carriage, a pivotally mounted framework, link means interconnecting said carriage and framework to cause reciprocation of the carriage as the framework rotates, a train of gearing carried by the casing, manually rotated means mounted on the casing and meshing with the gear train, planetary gearing mounted in the framework and in mesh with the gear train to cause rotation of the framework and drive the carriage upon the operation of the manually rotated means, solenoid means connected to said framework to rotate it in one direction upon energization, spring biasing means connected to the framework to rotate it in the opposite direction when the solenoid is deenergized, fly governor means connected to the gear train to control the rotation thereof, pivotal stop means in the casing to engage the governor and relay means for actuating the stop upon signal from the set to index the apparatus.

15. In radio apparatus, a casing, a carriage mounted for reciprocatory motion on said casing, means for tuning said radio apparatus over a predetermined frequency band mounted on said carriage, a pivotally mounted framework, link means interconnecting said carriage and framework to cause reciprocation of the carriage as the framework rotates, a train of reduction gearing carried by the casing, manually rotated means mounted on the casing and meshing with the gear train, planetary gearing mounted in the framework and in mesh with the gear train to cause rotation of the framework and drive the carriage upon the operation of the manually rotated means, solenoid means connected to said framework to rotate it in one direction upon energization, spring biasing means connected to the framework to rotate it in the opposite direction when the solenoid is deenergized, reversing switching means mounted on the casing and connected to the solenoid and switch operating stops mounted in spaced relation on the carriage to throw the reversing switch at the extreme ends of travel of the carriage.

16. In radio apparatus, a frame, a carriage reciprocably mounted on said frame, means for tuning said radio apparatus over a predetermined band of frequency mounted on said carriage, automatically controlled driving means for moving said carriage in both directions, a planetary gear system connected to the driving means and manually controlled means connected to the gear system so that the carriage may be moved either automatically or manually.

17. In radio apparatus, a frame, a carriage reciprocably mounted on said frame, means for tuning said radio apparatus over a predetermined band of frequencies mounted on said carriage, automatically controlled driving means for moving the carriage in both directions, a planetary gear system connected to the driving means, manually controlled means connected to the gear system so that the carriage may be moved either automatically or manually and friction driving means in the gear system which may slip and provide protection for the parts if the manual means is continued to be rotated after the carriage reaches a limit of movement.

18. In radio apparatus, a casing, a carriage mounted for reciprocatory motion on said casing, means for tuning said radio apparatus over a predetermined frequency band mounted on said carriage, a pivotally mounted framework, link means interconnecting said carriage and said framework to cause reciprocation of the carriage as the framework rotates, a train of gearing carried by the casing, manually rotated means mounted on the casing and meshing with the gear train, planetary gearing mounted in the framework and in mesh with the gear train to cause rotation of the framework and drive the carriage upon the operation of the manually rotated means and friction driving means in the planetary gearing which may slip and provide protection if movement of said manually rotated means continues after said carriage has reached a limit of movement.

19. In radio apparatus, a frame, a carriage mounted for reciprocatory movement on said frame, solenoid means connected to the carriage to move it in one direction upon energization, spring biasing means connected to the carriage to move it in the opposite direction to that of the solenoid, a reduction gear train connected to the carriage to be rotated by movement of the latter, a fly governor driven by the gear train, a plurality of pivoted stop members engageable with said governor to control rotation thereof, spring biasing means to tend to maintain one stop in engagement with the governor to block the same and to tend to maintain another stop means out of engagement, relay means for moving the first-mentioned stop means out of engagement with the governor, energizing means for the same operative at all times when the apparatus is in use, and relay means to move the second stop member into engagement with the governor when a voltage is generated in the apparatus upon transmitted signals being received to cause the drive to stop.

References Cited in the file of this patent

UNITED STATES PATENTS 1,968,302 Maurer ---------------- July 31, 1934
2,205,097 Knos et al. ------------ June 18, 1940
2,207,467 Muller ----------------- July 9, 1940
2,310,720 Wandrey ---------------- Feb. 9, 1943
2,326,738 Andrews --------------- Aug. 17, 1943
2,493,741 Andrews ---------------- Jan. 10, 1950
2,494,235 Gierwiatowski ---------- Jan. 10, 1950
2,499,573 Dunn ------------------- Mar. 7, 1950
2,511,580 Goodrick --------------- June 13, 1950
2,512,714 Carlzen ---------------- June 27, 1950
2,528,519 Jackson ---------------- Nov. 7, 1950
2,541,018 Andrews --------------- Feb. 13, 1951